United States Patent [19]

DiBrino et al.

[11] Patent Number: 5,581,734
[45] Date of Patent: Dec. 3, 1996

[54] MULTIPROCESSOR SYSTEM WITH SHARED CACHE AND DATA INPUT/OUTPUT CIRCUITRY FOR TRANSFERRING DATA AMOUNT GREATER THAN SYSTEM BUS CAPACITY

[75] Inventors: Michael T. DiBrino, Austin; Dwain A. Hicks, Cedar Park; George M. Lattimore, Austin; Kimming K. So, Austin; Hanaa Youssef, Austin, all of Tex.

[73] Assignee: International Business Machines Corporation, Armonk, N.Y.

[21] Appl. No.: 101,144

[22] Filed: Aug. 2, 1993

[51] Int. Cl.$^6$ .................................................. G06F 12/08
[52] U.S. Cl. ................ 395/496; 395/454; 395/457; 395/455; 395/448; 395/445; 395/447; 395/855
[58] Field of Search .............................. 364/200 MS File, 364/900 MS File; 395/425, 454–458, 463, 465, 467, 477, 480, 484, 487, 496, 855, 448, 445, 447

[56] References Cited

U.S. PATENT DOCUMENTS

| | | | |
|---|---|---|---|
| 4,056,845 | 11/1977 | Churchill, Jr. | 395/454 |
| 4,195,342 | 3/1980 | Joyce et al. | 395/445 |
| 4,371,929 | 2/1983 | Brann et al. | 395/865 |
| 4,374,410 | 2/1983 | Sakai et al. | 395/416 |
| 4,442,487 | 4/1984 | Fletcher et al. | 395/449 |
| 4,445,174 | 4/1984 | Fletcher | 395/448 |
| 4,527,238 | 7/1985 | Ryan et al. | 395/450 |
| 4,695,943 | 9/1987 | Keeley et al. | 395/467 |
| 4,736,293 | 4/1988 | Patrick | 395/455 |
| 4,783,736 | 11/1988 | Ziegler et al. | 395/457 |
| 4,905,141 | 2/1990 | Brenza | 395/456 |
| 4,941,088 | 7/1990 | Shaffer et al. | 395/448 |
| 4,953,073 | 8/1990 | Moussouris et al. | 395/403 |
| 4,959,777 | 9/1990 | Holman, Jr. | 395/468 |
| 5,070,444 | 12/1991 | Kubo et al. | 395/454 |
| 5,185,878 | 2/1993 | Baror et al. | 395/450 |
| 5,386,537 | 1/1995 | Asano | 395/484 |
| 5,398,325 | 3/1995 | Chang et al. | 395/403 |

OTHER PUBLICATIONS

Wright, *RISC boards target real–time applications*, EDN, v34, n7, p. 69(8), Mar. 30, 1989.
Gilmour, *Speed the execution of your MuP–MuC software*, EDN, v34, n11, p. 177 (8), May 25, 1989.
Atkins, *Dual processors boost computer power*, Electronics Design, v40, n4, p. 122(6), Feb. 20, 1992.
Andrews, *The Pentium gets GaAs*, Computer Design, v32, n7, p33 (3), Jul. 1993.
IBM TDB, "Improved Store–Thru Cache", vol. 34, No. 1, Jun. 1991, pp. 370–374.

*Primary Examiner*—Matthew M. Kim
*Attorney, Agent, or Firm*—Mark E. McBurney

[57] ABSTRACT

A high performance shared cache is provided to support multiprocessor systems and allow maximum parallelism in accessing the cache by the processors, servicing one processor request in each machine cycle, reducing system response time and increasing system throughput. The shared cache of the present invention uses the additional performance optimization techniques of pipelining cache operations (loads and stores) and burst-mode data accesses. By including built-in pipeline stages, the cache is enabled to service one request every machine cycle from any processing element. This contributes to reduction in the system response time as well as the throughput. With regard to the burst-mode data accesses, the widest possible data out of the cache can be stored to, and retrieved from, the cache by one cache access operation. One portion of the data is held in logic in the cache (on the chip), while another portion (corresponding to the system bus width) gets transferred to the requesting element (processor or memory) in one cycle. The held portion of the data can then be transferred in the following machine cycle.

13 Claims, 6 Drawing Sheets

A. non-Pipelined Access without Burst-mode (8 Cycles)

| Cycle 1 | Cycle 2 | Cycle 3 | Cycle 4 | Cycle 5 | Cycle 6 | Cycle 7 | Cycle 8 |
|---|---|---|---|---|---|---|---|
| Request/Addr sent from CPU to cache | Array Access | Output Logic | Data to CPU (L) | Request/Addr sent from CPU to cache | Array Access | Output Logic | Data to CPU (L) |

B. Pipelined Access without Burst-mode (5 Cycles)

| Cycle 1 | Cycle 2 | Cycle 3 | Cycle 4 | Cycle 5 |
|---|---|---|---|---|
| Request/Addr sent from CPU to cache | Array Access | Output Logic | Data to CPU (L) | |
| | Request/Addr sent from CPU to cache | Array Access | Output Logic | Data to CPU (L) |

FIG. 5

C. non-Pipelined Access with Burst-mode (10 Cycles)

| Cycle 1 | Cycle 2 | Cycle 3 | Cycle 4 | Cycle 5 | Cycle 6 | Cycle 7 | Cycle 8 | Cycle 9 | Cycle 10 |
|---|---|---|---|---|---|---|---|---|---|
| Request/Addr sent from CPU to cache | Array Access | Output Logic | Data to CPU (L) | Data to CPU (L) | Request/Addr sent from CPU to cache | Array Access | Output Logic | Data to CPU (L) | Data to CPU (L) |

D. Pipelined Access with Burst-mode (One dead cycle for the second access since data is for the same CPU) (7 Cycles)

| Cycle 1 | Cycle 2 | Cycle 3 | Cycle 4 | Cycle 5 | Cycle 6 | Cycle 7 |
|---|---|---|---|---|---|---|
| Request/Addr sent from CPU to cache | Array Access | Output Logic | Data to CPU (L) | Data to CPU (L) | Data to CPU (L) | Data to CPU (L) |
| | | Request/Addr sent from CPU to cache | Array Access | Output Logic | | |

FIG. 6

MULTIPROCESSOR SYSTEM WITH SHARED CACHE AND DATA INPUT/OUTPUT CIRCUITRY FOR TRANSFERRING DATA AMOUNT GREATER THAN SYSTEM BUS CAPACITY

BACKGROUND OF THE INVENTION

1. Field of the Invention

The present invention relates to a cache for use in a multiprocessor (MP) computer system. More particularly, a cache is provided that is capable of accommodating one data request (load or store) per processor each cycle. Performance enhancement techniques such as interleaving, pipelining, burst-mode logic and the use of multiple data and address/request ports are collaborated to provide this improvement.

2. Description of Related Art

In conventional multiprocessor systems it is common to design a cache which than is larger commonly used by uniprocessor systems. This is due to the fact that most program applications in multiprocessor systems require more data manipulations than uniprocessor applications. The problem with larger caches is that more signal propagation delay time is present and more levels of logic are required to decode data addresses, which causes the cache access time to increase due to the large cache size. Thus, cache designers are faced with the challenge of trying to satisfy the needs of the multiprocessor systems's application by providing sufficient cache density, while maintaining optimal system performance.

The IBM Technical Disclosure Bulletin, volume 34, number 1, Jun. 1991, describes a memory hierarchy for a multiprocessor system in which each processor has a private level-one (L1) cache and a level-two (L2) cache shared by plural number of the processors. When a line is loaded with data from the L2 cache, to be provided to the L1 cache, the location in the L1 cache is recorded such that the location can be used to access the L2 cache for subsequent store operations, without having to look up the L2 directory.

U.S. Pat. No. 4,371,929 discusses a multiprocessor system with a controllable cache store interface to a memory which employs a plurality of storage partitions having interleaved access in a time domain multiplexed manner on a common bus. The storage partitions are uniquely associated with each host adapter, corresponding to each processor. Interleaved operations allow several host processors to be serviced during a single host processor I/O channel transfer period. However, when a full block data transfers from the cache to memory is started, interleaving of other data transfers with the full block transfer are not permitted. Thus, certain data transfers must wait until the full block transfer is complete.

U.S. Pat. No. 4,056,845 describes a cache memory system which can be used for interleaved or non-interleaved operation. U.S. Pat. No. 4,445,174 discusses a multiprocessing system wherein each processor has a private cache and shares a common cache and main memory with the other processors. U.S. Pat. No. 4,905,141 describes a cache memory system wherein the cache is divided into partitions which operate independently and in parallel. The cache includes multiple ports such that multiple, independent cache operations can occur during a single machine cycle.

As noted above, with conventional multiprocessor systems it is common to design a larger cache than required in uniprocessor systems. This is due to the fact that most program applications in multiprocessor systems require more data manipulations than uniprocessor applications. The problem with larger caches is that more signal propagation delay time is present and more levels of logic are required to decode data addresses. This factor causes the cache access time, i.e. response time, to increase as the performance tradeoff for the increased cache size. In addition to the need for a reduced response time in computer accesses, the cache cycle time (request intervals) is another performance related issue that must also be considered when designing such multiprocessor computer systems. It is desired that a request to load, or store, data be supported by the cache for each central processing unit (CPU)/machine cycle. If this performance is achieved, then the cache will be able to keep up with, or maintain the performance level, as measured in machine cycles, of the processing elements (CPUs) in the multiprocessor system.

Conventional cache design techniques used to improve the multiprocessor system performance have addressed features that boost the system performance, such as cache interleaving combined with multiple ports. Interleaving allows for concurrent accesses to data in the different array blocks within the cache. Furthermore, interleaving reduces the cache response time per access, since the data is distributed in small array blocks (interleaves), making the access time in the cache less than a similarly sized non-interleaved cache. Since data is accessed simultaneously from the cache interleaves, parallel data paths to the requesting processing elements are needed, thus multiple ports in the cache are used to support interleave cache systems.

In the present invention, the features of interleaving with multiports are effectively employed. However, conventional systems do not allow each processing unit to access the cache simultaneously in each machine cycle. Therefore, the present invention uses additional performance enhancement techniques to significantly improve the overall performance and allow the cache to service one request from each processor per cycle.

SUMMARY OF THE INVENTION

The present invention differs from the prior art because the specific collaboration of cache interleaving, multiports, pipelined architecture and burst-mode access are all utilized to allow the cache to service one request from each individual processing element, in the multiprocessor system, per machine cycle.

Broadly, the present invention provides a high performance shared cache to support multiprocessor systems with maximum parallelism in accessing the cache. That is, servicing one processor request in each machine cycle, reducing system response time and increasing system throughput.

None of the conventional systems have utilized all the aforementioned techniques in order to optimize system performance. The present invention adds additional performance enhancement techniques to interleaving and multiple ports in order to achieve maximum sharing of the cache. More specifically, system performance is optimized by approximately an order of magnitude when compared to the prior art. This performance optimization is accomplished by using the system architecture techniques of pipelining and burst-mode access. By including built-in pipeline stages, the cache is enabled to service one request every machine cycle from any one of the processing elements. This contributes significantly to the system throughput and ensures 100% array utilization by allowing the cache to receive a request (load or store) every machine cycle, i.e. cache cycle time= CPU cycle time. Second, the present invention increases the overall throughput by using logic, known as burst-mode logic, which is described in more detail below. By including built-in pipeline stages, the cache is enabled to service one request every machine cycle from any one of the processing elements. This contributes significantly to the system throughput and ensures 100% utilization of the cache. With regard to the burst-mode data accesses, the widest possible data out of the cache (data words) can be stored to, and retrieved from, the cache in one cache access operation. One portion of the data is held in logic within the cache, while the other portions (equal to the system bus width) get transferred to the requesting element (processor or memory) in one cycle. The held portions of the data can then be transferred in the following machine cycles. Although, it may take more than one machine cycle to transfer data between the cache and external elements (e.g. processors and memory), the actual data transfer into and out of the cache is achieved in a single cache operation cycle.

By adding the pipelining and the burst-mode features to the shared cache design, the present invention provides savings of approximately 44% in machine cycles. This percentage improvement is based on the following: (1) it takes one machine cycle to receive a request from the processing element; (2) the cache array latency for one interleave is one machine cycle; (3) one machine cycle is dedicated for directing the data accessed from the array and enabling the data driver for the requesting port: and (4) one machine cycle is used to transfer the data to the processing element. Under these conditions, in a non-pipelined cache system without the burst-mode logic, the desired data of width 4L (in a preferred embodiment this will translate to 160 bits) was accessed in 16 machine cycles, which compared to a total access time of the same data in 7 machine cycles in a pipelined cache with burst-mode logic. thus, 7 cycle versus 16 cycles is a 44% performance improvement.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 5 (diagrams a and b)is a logical timing diagram that compares the significant timing difference (in machine cycles) between a first pipelined cache, in accordance with the present invention and a second cache that is not pipelined;

FIG. 6 (diagrams C and D) is another logical timing diagram illustrating the timing difference between a non-pipelined cache using burst- mode logic and a pipelined cache using burst-mode logic.

DETAILED DESCRIPTION OF THE PREFERRED EMBODIMENTS

Figure 1:
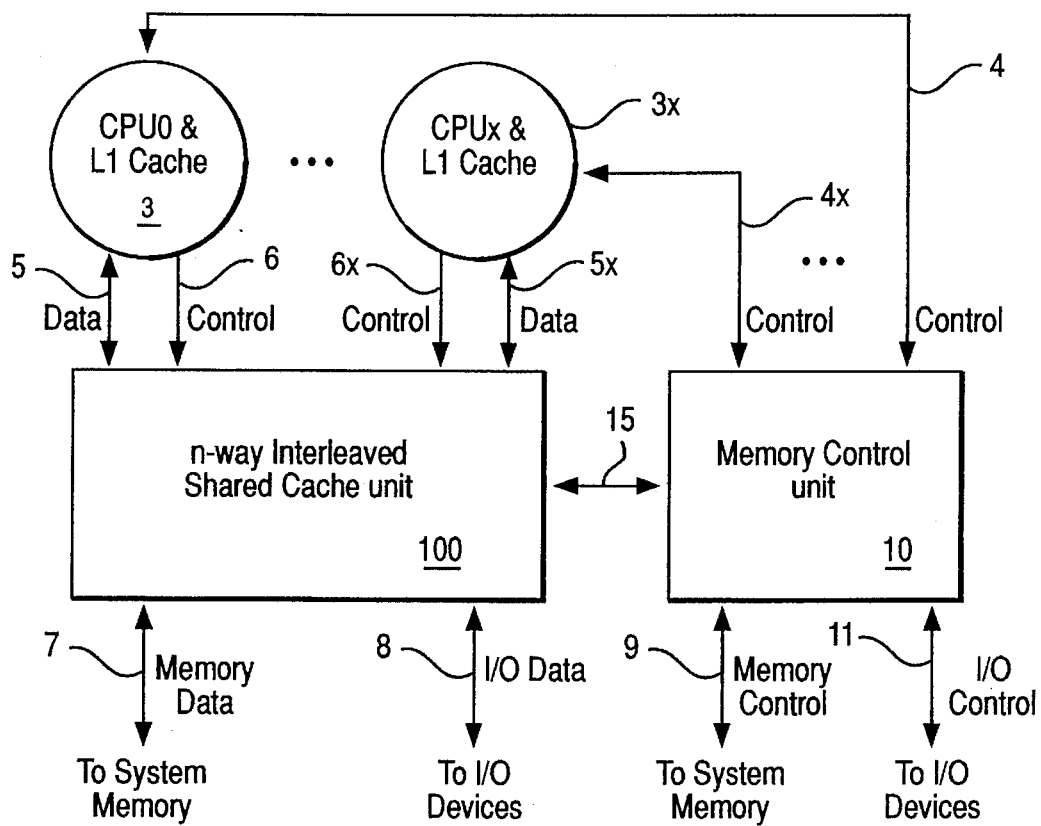
FIG. 1 is a block diagram showing an X-way multiprocessor system including the shared cache of the present invention and a supporting memory controller unit.

FIG. 1 is a block diagram showing an X-way multiprocessor system in accordance with the present invention. More specifically, processors 3 through 3x are shown each of which represents a central processing unit (CPU), such as one of the RISC System/6000 processors manufactured and sold by the IBM Corporation. These processors include a level 1 (L1) cache in the CPU itself for storing frequently used data. In a preferred embodiment, four processing units 3 are used in the system, however is should be understood that virtually any number of processing units can be used with the shared cache of the present invention, subject to performance/cost tradeoffs.

Figure 2:
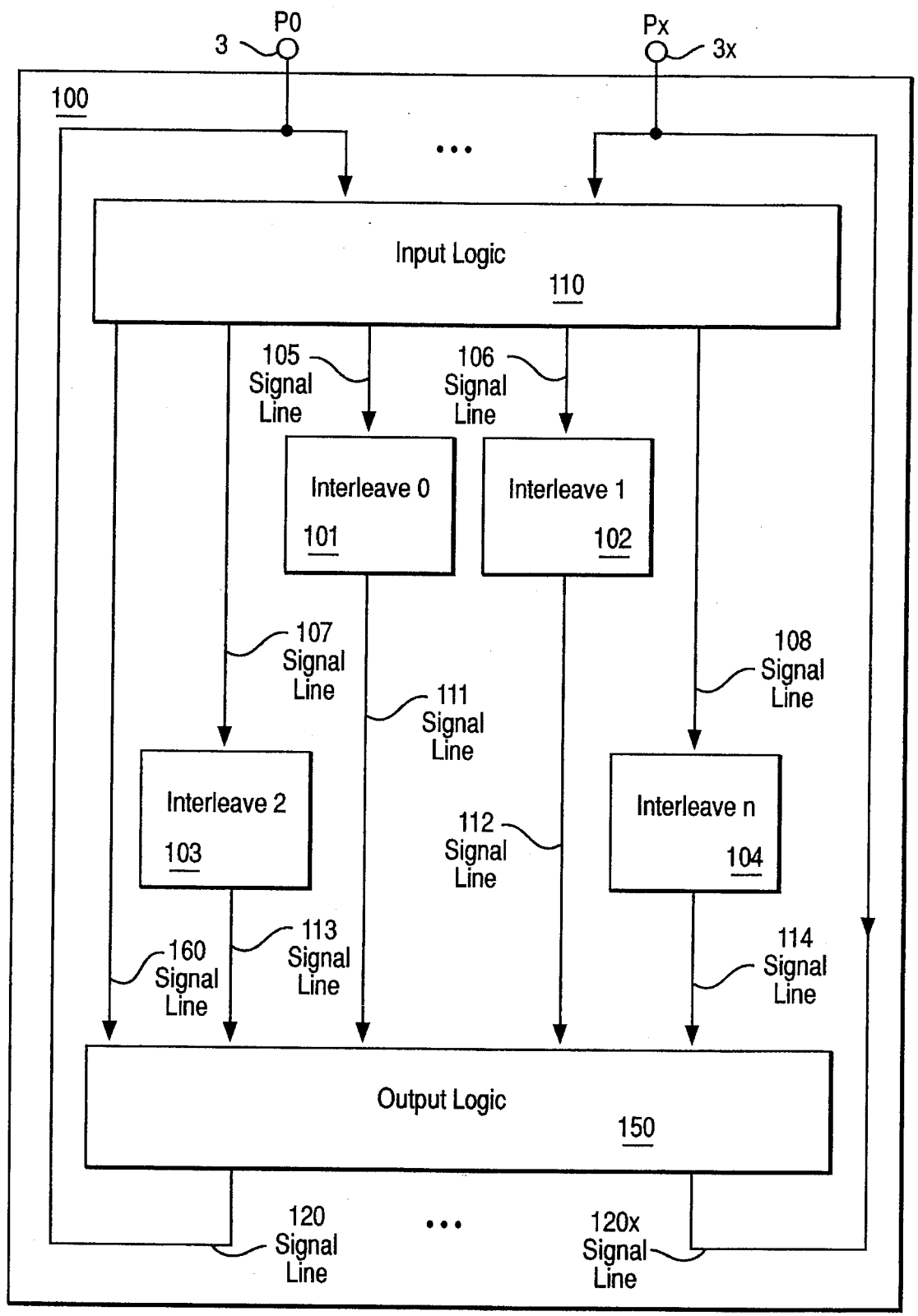
FIG. 2 is a high level schematic diagram of the shared cache of the present invention illustrating the major components of the unit, such as data ports and interleaves.
Figure 3:
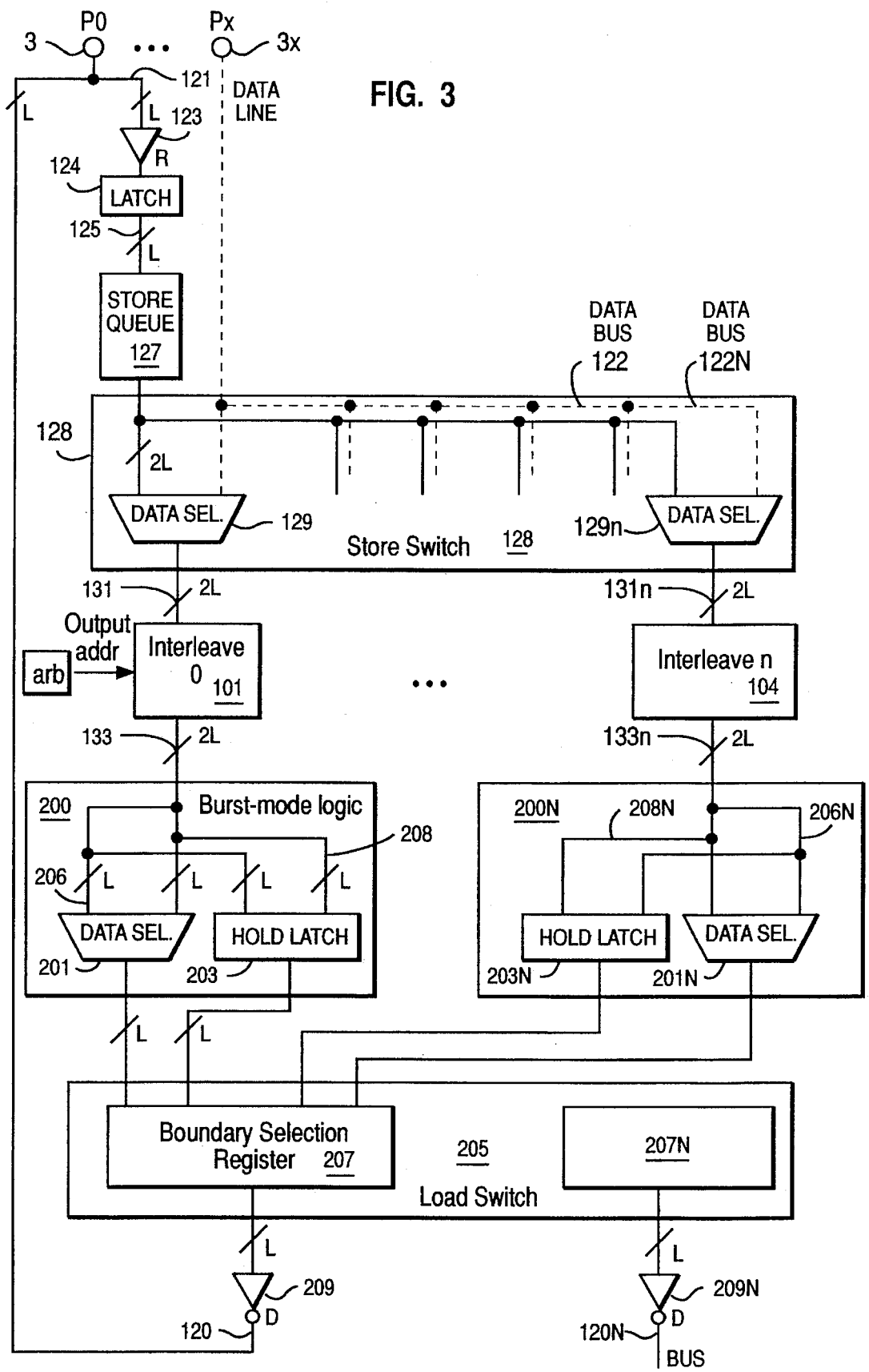
FIG. 3 is a diagram showing the circuit elements of the shared cache and the data flow into and out of the cache.

Reference numeral 100 represents the interleaved shared cache unit of the present invention. This shared cache includes N number of interleaves, wherein N is greater than or equal to X (number of processors). Additionally, a memory control unit 10 is shown in FIG. 1. Control signals in the form of request/addresses for data are received directly from processing elements 3–3X via signal lines 6 and 6X. Arbitration circuitry, located in input logic 110 (FIGS. 2 and 3) provides a scheme, which is used to forward these processor request to the target interleave, e.g. 101, 102, 103, 104 (FIG. 2). Once the interleave is accessed, the retrieved data is then sent to the requesting processor via the output logic 150 (FIGS. 2 and 3). In the case where the requests of two, or more, processing elements collide, i.e. both requests targeted the same interleaf during the same cycle, only one requesting will be serviced. Which request is to be serviced is based on state machine logic which selects the request from the least recently serviced processor. The unserviced request is queued in a buffer, latch, or the like in the MCU 10 and is later serviced via signal line 15. MCU 10 maintains a directory of data requests (loads and stores) such that the request from the least recently serviced processor can be determined. It should be understood that the arbitration scheme selection is based only on the most least recently serviced processing elements. Those requests queued in the MCU directory (request queue), e.g. requests which have previously lost the arbitration selection, are prioritized over the requests received directly from the CPUs. Thus, by prioritizing the previous requests, the present invention solves the problem wherein the MCU directory could be filled with requests, which go unserviced, due to new requests from the CPUs.

Additionally, the present invention includes a data flow path (signal line 160 in FIG. 2) that allows data to be transferred between processor 3–3X through shared cache 100, thus saving the time delay of the array access and freeing up the array for another access from a different source (processing element). This data flow path is controlled by logic contained in MCU 10 and provided to cache 100 via signal line 15. Signal line 7 is the data path between the shared cache 100 and system memory (not shown). When a processor requests data, that is not in the L2 cache 100 a cache miss occurs and control logic in MCU 10 forwards the request to main memory via signal line 9. After main memory access for this request, data will flow from main memory to the requesting processor via the shared cache 100, using the input and output logic (110 and 150) in the cache unit such that the data is simultaneously stored in the appropriate cache 100 interleaf, along with control signals from MCU 10, via signal line 15. This data flow from memory during a cache miss is similar to the processor to processor data flow described above. The main memory control and data flow can be applied to the input/output (I/O) devices through an I/O port in cache 100. the previous description of retrieving data from system memory applies as well to I/O data transfers except that signal line 8 and signal line 11 are used instead of signal lines 7 and 9. These I/O devices may include fixed disk memory, small computer systems interface (SCSI) drives, communications ports, and the like.

Processors 3 and 3x are interconnected to the various interleaves through the shared cache unit 100 by control signal lines 6 and 6x, as well as data signal lines 5 and 5x. In this manner, data can flow from one processor to another, via lines 5 and 5x, through the shared cache, thereby saving the time delay for accessing the interleaf where the data is residing. That is, the data flows between the shared cache and the processors so that each processor is not required to perform independent load and store operations to retrieve and transmit the data to the other. The control signal lines are used to provide timing signals, and the like to aid in the store and load operations between processors 3 and shared cache 100.

Signal line 7 allows data to be loaded from and stored into the system memory (not shown) which is interconnected to cache 100. Signal line 9 is also connected to memory and provides the control signal needed to transfer data between the memory and cache 100. Further, data can be transferred between cache 100 and any interconnected I/O devices (not shown). These I/O devices may include fixed disk memory, SCSI drives, communications ports, or any other devices that may need to send data to a processor 3, or receive data from a processor. Signal line 11 is used to provide control signals between the MCU 10 and the various connected I/O devices to facilitate the transfer of data therebetween.

FIG. 2 is a block diagram of the shared cache 100 shown in FIG. 1 which illustrates major functional components of the cache and the logical flow of data therebetween. As stated above, cache 100 has X number of data input ports which correspond to the X number of processors present in the X-way multiprocessor system. Further, the cache includes an N-way interleaved cache where N is greater than or equal to X (N and X are equal to 4 in the illustrative diagram). Thus, any one of the X processors can independently access any one of the N interleaves at a given time. More particularly, if N is greater than X, then it will always be possible for each processor to access a cache interlaced section, as inferleaf, during each cycle, however, if N was less than X it can be seen that at least one processor would have to wait during each cycle, because there was not a corresponding interleaf.

Figure 7:
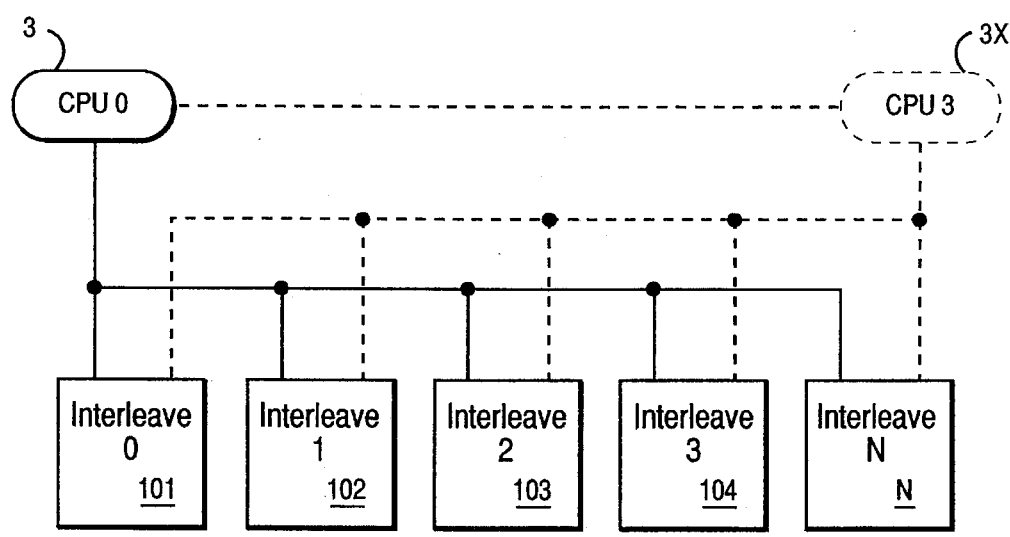
FIG. 7 is a high level diagram showing the processing element access of the individual interleaves in the system of the present invention.

FIG. 7 shows a multiprocessor system having X number of processors 3–3X (in this case 4) and N number of cache interleaves 101, 102, 103, 104 to N (in this case 5). Thus, it can be seen how four processors 0–3 can transmit data between 5 interleaves 101-N and each processor can access an interleaf, each machine cycle. It is also apparent that if less interleaves are present than processors, then at least one processor will have to wait while the others access the cache interleaves. Thus, for N less than X, the cache will not be able to service a data transfer request from each processor, each machine cycle. Therefore, it is a requirement of the shared cache of the present invention that the number of interleaves be greater than or equal to the number of processors.

Again, reference 100 is the shared cache of the present invention with processors 3 through 3X shown connected to the cache 100. Input logic 110 includes components necessary to store data that has been manipulated by processor 3 in the shared cache 100. These components are receivers, data buffers, data selection multiplexer(s), and the like. The input logic 110 will be discussed in greater detail in conjunction with FIG. 3. Interleaves 101, 102, 103 and 104 are distinct locations in the cache memory. It should be noted that the 4-way MP system described herein is merely used as an example and MP system having other numbers of processors are contemplated by the present invention. By way of example and not limitation, a 4-way MP system is found to give good performance using an L2 cache with a total density of 4 megabytes of storage. To achieve this performance the present invention was designed such that each chip in the shared cache has 4 megabits of storage and 8 chips are used to achieve the total desired storage density. The total of 4 megabits per each one of the 8 cache chips can be distributed over the 4 interleaves making each interleave within the cache unit 1 megabit in storage size. In a preferred embodiment eight static random access memory chips (SRAMS) were used in the four way multiprocessor system. Additionally, a system designer will be able to configure a larger cache than just described by: (1) using additional array interleaves (such as shown in FIGS. 2 and 3) for each cache 100 chip which requires the data bus from the processor to fan out to the extra interleaves, and modifies the cache 100 chip internally, but does not affect the data bus to the processing elements (FIG. 7); and (2) using additional L2 cache chips 100 without changing the number of interleaves inside the chip (this requires widening the data bus from the processor to support the extra chip(s), but does not require changes in the chip itself.

Output logic 150 receives the data retrieved from the various arrays in the shared cache 100 and outputs it to the requesting processor. This logic is a set of N hardware components and includes the burst-mode logic, data selection switches, latches, load switch, registers, drivers, and the like. There will be N sets of output logic components corresponding to each of the N arrays in the shared data cache 100.

From FIG. 2, it can be seen that processors 3 through 3X store data in the shared cache 100 by transmitting the data to the input logic 110, which then processes the data and, based on the address provided by any of the processor 3–3x, or the MCU 10, sends it to the appropriate interleaf by way of signal lines 105, 106, 107, 108. The MCU 10 only provides addresses for CPU requests that lost during previous arbitration, main memory requests or I/O requests. Once the data is stored in the cache it is then retrieved when a requesting processor sends a load instruction to the cache, which will be transmitted through the input logic 110 (or from the MCU 10 if the load is the result of arbitration). Once the target interleaf 101–104 is accessed, the data stored therein will be transferred to the output logic 150 via signal lines 111, 112, 113, 114. Under the control of signals from MCU 10, the data from the output logic 150 will be transferred to the requesting processing elements 3–3X via signal lines 120 . . . 120X. It can be seen from FIG. 2, that the interleaves 101, 102, 103, 104 allow store and load operations from multiple processors to occur concurrently, i.e. to overlap due to the pipelining provided by the present invention.

The individual components of the input logic 110 and output logic 150 will now be described in accordance with FIG. 3 which is a schematic diagram indicating the data flow within the shared cache 100. The data flow shows incoming data going into a store queue buffer, out to a plurality of data selection switches configured as a store switch, into the cache interleaves. During a load operation, the data will flow out of the selected interleave, into the burst-mode logic and to another one of a plurality of data selection switches configured as a load switch, and then to a data input port of the requesting processor 3. The controls for the store queue, the store switch, the store and load operations into and from the cache array, the burst-mode logic, the load switch and driver enable are all received from the memory controller unit 10.

More particularly, processors 3 through 3X store data by placing a data word of width L along data line 121. In a preferred embodiment, the data word will be 40 bits wide wherein 32 bits are used for data and 8 bits are utilized for ECC (error checking and correction). Receiver 123 accepts the data and stores it in a latch 124. In the next CPU cycle the data is transferred along data line 125 to store queue 127. Data is kept is store queue 127 until the control. signals from the MCU 10 are sent to unload the data into the store switch 128 and then into the targeted interleaves 101, 102, 103, 104. It should be noted that the store address in provided to the cache 100 by MCU 10 via signal line 15. Thus, MCU 10 provides addresses not only under normal circumstances (during cache access by a processor), but also when an arbitration, memory data transfer or I/O data transfer occur, and will also provide control signals dictating when the data in the store queue 127 will be transferred to the data selection switch 128. Store queues are included in the cache (one store queue per data port, i.e. X store queues are present) to allow the cache to absorb streaming data as may occur in the case of a store through where data is stored directly into both the L1 (first level cache) and shared L2 cache 100. The store queues 127 receive data that is L bits wide, accumulates this data and unloads it out of the queues 127 in data words that are 2L bits wide (e.g. 80 bits, with 64 bits of data and 16 bits as ECC and tag bits) in first-in first-out (FIFO) access mode. That is, the first portion of data that is L bits wide is concatenated with the second portion of the data, which is also L bits wide and arrives a cycle later on bus 125. Thus when an "unload buffer" (unload store queue) command is received from the MCU 10, a data word of 2L bits wide is then unloaded from the store queue 127 and input to store switch 128. It should be understood that during store operations, data received from any of the 3–3X processing elements may be stored into any of the interleaves 101 ... 104 of cache 100. Data is buffered through these store queues and is stored into the cache array in larger granularities, for example 2L, due to the burst-mode logic 200. It should be noted that each one of processors 3 through 3X will have a corresponding receiver 123, store queue 127 and associated data lines for receiving data that is to be stored in the cache by the processor. For the sake of simplicity, these elements have only been shown for processor 3 (P0), but are present for each processor. Further, the following description will address only those elements associated with processor 3 (P0), however, those skilled in the art will understand how each of the processors in the multiprocessor system of the present invention will operate in an identical manner. Store switch 128 receives the 40 bit data from the queue 127, in a first-in first-out order, and performs several functions, including routing stored data from the various store queues 127 to the actual cache .interleaf where the data will be stored. That is, the data from processor 3, stored in queue 127 may need to be stored in interleaf 104, or the like. Data selection units 129 through 129N, contained in selection switch 128, provide this switching function. MCU 10 provides a control signal through data line 15 to store switch 128 and ultimately to one of the data selection units 129, that send the data from the inputting processor to the desired interleaf. It can be seen that data from the processors 3 through 3X can be input to any of the data selection units 129 through 129N by way of data buses 122 through 122N. These buses allow interconnection of each of the processors 3–3X with each of the data selection units 129–129N, such that data from any of the store buffers 127–127N (associated with the corresponding processor) can be written into any of the interleaves 101–104. The multiple data buses (ports) are configured as bidirectional ports in order to save I/O pins in the cache unit. Each data port has an address/request port associated with it. The address/request ports for main memory and I/O data transfers are sent via the MCU 10 address/request port (signal line 15 of FIG. 1).

One data selection unit 129 is present for each interleaf. These data selection units are essentially multiplexers that pass a corresponding one of the X number of inputs (from the X number of processors) to the corresponding interleaf.

In a preferred embodiment of the present invention, the data provided to the interleaves is in the form of data words which are 80 bits wide. These 80 bit words consist of two 40 bit words wherein each 40 bit word has 32 bits of data and 8 bits for ECC and tags. As noted above, a data word of L width is considered to be 40 bits, therefore, 2L indicates a data word of 80 bits. In a 4-way multiprocessor system, the will be 4 store queues (one per processor). It can be seen from FIG. 3 that the interleaves are capable of handling 80 bit data words, i.e. words of width of 2L. The multiplexers 129 in the store switch 128 will receive 4 sets of 80 bit wide data words (one 2L data word 80 bits wide from each queue 127). Depending on which one of the four 80 bit data words will be written into which one of the 4 interleaves 101–104, MCU 10 will send the proper control signal, via line 15, to selection switch 128. This MCU control signal will, for example, store date from CPU0 (labelled 3) into interleave 0 (labelled 101). These data words of width 2L are provided along data lines 131 through 131N to ports in the interleaves. Thus, it can be seen how the shared cache of the present invention includes multiple ports for concurrently storing 80 bit data words from different processors 3 through 3X.

Further, those skilled in the art will understand how more than one of the processors 3 through 3X may attempt to store data in the same one of interleaves 101 through 104 at the same time. thereby causing a conflict, or collision. Control logic in MCU 10 will prevent these conflicts from occurring because each multiplexer 129 in the store switch logic has separate orthogonal selection signals that allow one store into each interleave at a time. It should be noted that no data will be stored into two different interleaves, i.e. each array interleave holds unique data throughout the cache.

Additionally, arbitration logic 300 (FIG. 4) is used that will only provide access to the processor that has not accessed the particular interleaf (subject to the conflict) for the longest period of time. This arbitration logic 300 will be discussed in greater detail in conjunction with FIG. 4.

The previous discussion dealt with a store operation where at least one of the processors placed data in the cache to be used at a later time. A load operation, retrieves previously stored data from the shared cache of the present invention to be used in processing operations. Like the data input to the array interleaves, the output data is also 2L wide (80 bit data words). This will allow the same amount of data to be stored to, and loaded from, the cache in a single cache cycle. The data to be loaded into the processor 3 is retrieved from the interleaves from data lines 133 through 133n and provided to burst-mode logic units 200–200n.

The burst-mode logic units allow the 80 bit data words from the interleaves to be divided into 40 bit data words that can be handled by the system bus, which is only 40 bits wide.

When data is requested by one of the processors 3–3X, the interleaf, or array, will output an 80 bit data word (2L in a preferred embodiment of the present invention). to burst-mode logic 200. The first 40 bits (lower data) are passed along signal line 206 through the burst-mode multiplexer 201 as the first data transfer to the requesting processor, while the second 40 bits (upper data) are provided to latch 203 and then released during the next cycle. The burst-mode logic 200–200N includes a selection multiplexer 201 which selects one of the 40 bit portions of the original 80 bit data word, e.g. the first 40 bits from line 206–206N, and sends that data on through the burst-mode logic 200 during the same cycle in which it is received. The other component of the burst-mode logic unit 200 is a selection latch 203–203N, where the non-selected 40 bit portion of the original 80 bit data word is latched. In this example, the second 40 bit portion from line 208–208N that was not selected by the multiplexer 203 will be held in latch 203. This second 40 bit portion will be released in the next machine cycle after the cycle in which the first 40 bit portion is passed to the load switch 205. Thus, the 80 bits of data out of the interleave is serialized into two transfers of consecutive 40 bit portions. The serialized data words are passed through the boundary selection register 207–207N which is controlled by signals from MCU 10. The data from boundary selection register 207 is transferred from the cache chip to the processor chip, via bus 120–120N, by enabling the driver 209–209N. The power of the data signal output from the boundary selection register must be amplified by driver 209 in order to compensate for losses present in line 120. The driver enable control is also provided by MCU 10, which keeps track of the availability of bus 120 in a directory maintained in the MCU.

Thus, it can be seen how the present invention provides an interleaved multiport, pipelined, shared cache system using burst-mode logic techniques to allow servicing of one processor request (load or store) for each machine cycle.

Figure 4:
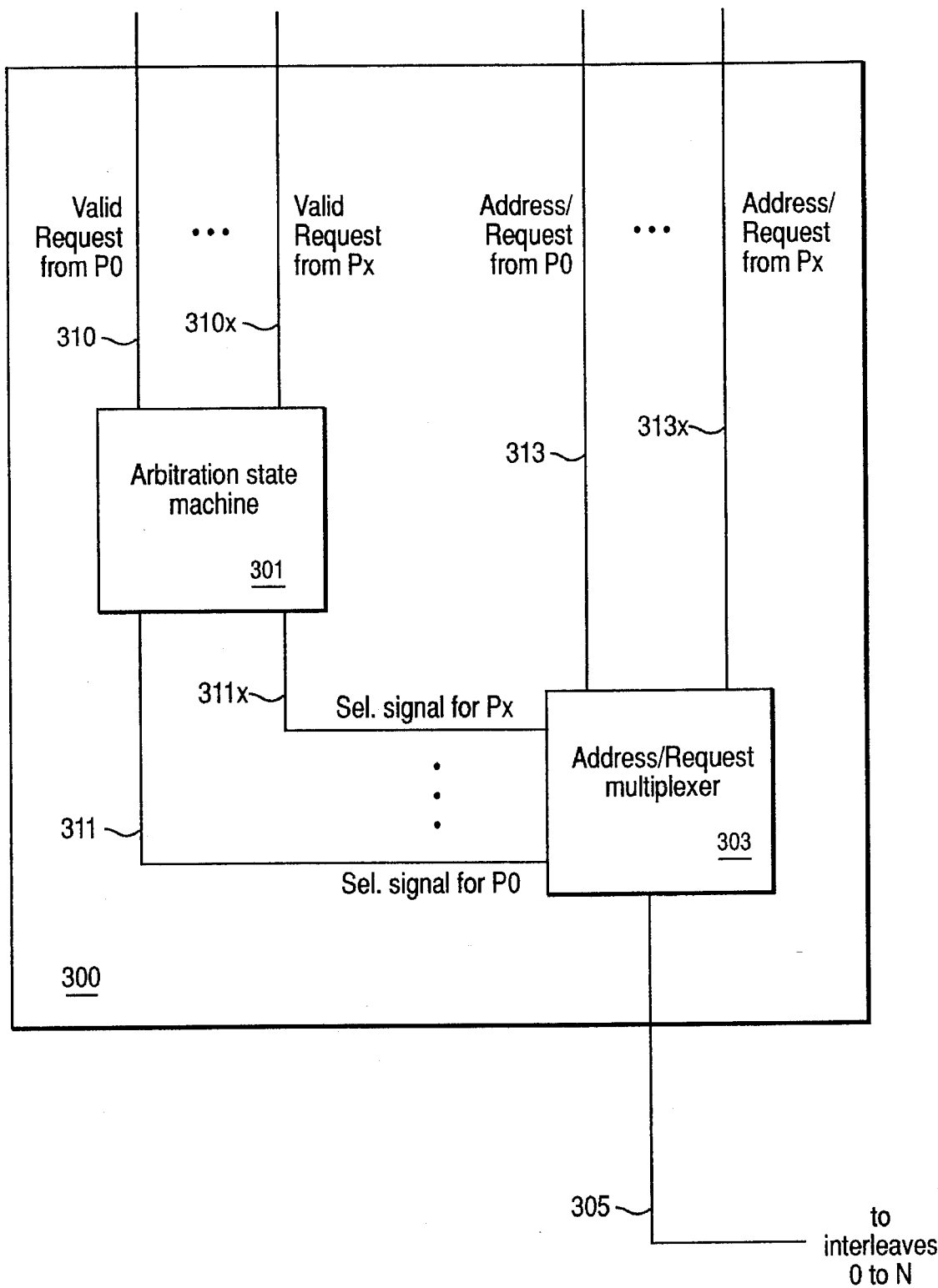
FIG. 4 is a logical diagram illustrating, at a high level, the arbitration logic used by the present invention to select an address/request and start array access, when multiple requests are concurrently directed to the same interleave.

FIG. 4 is a diagram of the arbitration logic and the address/request selection path. The valid request signals 310–310X are 1 bit signals that are received from every requesting source (e.g. processors 3–3X or the MCU). In the case when one or more of the valid request signals become active, as a result of a request initiation, the arbitration state machine logic 301 generates the active values (high or low) at the select signal lines 311–311X. These lines are used to select only one of the address/request signals 313–313X. The selection, as previously described, is based on the least recently serviced source amount the processor ports, while the MCU request get highest priority. Reference 303 is a selection multiplexer through which the winning address/request 305 passes and is ultimately received at the array to which access is desired.

The arbitration logic 300 is contained in the input logic 110 in the cache and duplicated on the MCU chip 10. Thus when data access is required by the processors, they will send the address/request information to both the cache unit 100 and MCU 10. Signal lines 310–310X transmit information regarding which source (processor) is sending a valid data transfer request. The arbitration logic 300, includes a state machine that checks the validity of the requests for a particular interleaf that have been received from the processors on lines 310–310X, and arbitrates between them. The processor that was serviced least recently will win the arbitration. For example, if 310 and 310X were active (both transmitted valid request signals) and 310X (CPUX was the last processor to access the array, then 310 (CPU 0) will win the arbitration and the arbitration logic then makes select signal 311 active. The arbitration logic generates select signals, which indicate which one of the processors has won the arbitration and outputs these signals on lines 311–311X. The actual address/request signals from processors 3–3X are input on signal lines 313–313X. When the select signal is active, the corresponding address/request signal will be selected and passed through the multiplexer 303. Thus, the activated select signal essentially tells the multiplexer 303 which one of the address/request signals to pass through, thereby allowing the corresponding processor to access the desired interleaf. The winning address/request signal from one of lines 313–313X is then output to the cache on signal line 305. In the previous example, since line 311 contained the active select signal, the address/request on line 313 (from processor 3, i.e. CPU 0) will be selected by multiplexer 303 and passed to the desired interleaf in cache 100 via line 305. The selected address/request from the arbitration select multiplexer will then cause the array to start the desired access. The address/request signal corresponding to the processor that did not win the arbitration (in this case the address/request signal on line 313X) is then stored in a queue (designated for that processor's requests) in the MCU 10 such that the processor request can be retried for access to the desired cache interleaf, via the MCU request port (signal line 15), at a later time. The arbitration logic will guarantee that the queued request, from MCU 10 will win the arbitration in the next selection round.

FIG. 5 is a logical timing diagram that shows the significant timing difference (in machine cycles) in two caches, one which is pipelined and another non-pipelined, with neither of the caches having burst-mode logic. Pipelined, refers to the ability to latch data into buffers, or the like, at various points throughout the system. This allows data to enter the system without the necessity of the entire process being complete, i.e. data that has entered the system is latched (saved) as it moves between various logical components and, therefore, additional data can be input while the existing data is moving through the system. Pipelining is an implementation technique that improves throughput by overlapping the execution of multiple logic steps.

In FIG. 5, the logical pipeline consists of four stages: (1) arrival of the address/request and arbitration; (2) array access; (3) output logic (burst-mode); and (4) data transfer to the requesting processor. The first timing diagram (A) refers to a non-pipelined, interleaved cache having no burst-mode logic. For the sake of simplicity, it is assumed that each stage takes one machine cycle. Diagram A shows that in a system without pipelined access, the second request for data cannot start until the first is completely finished, thereby taking twice the number of cycles to service two data transfer requests, e.g. 8 cycles in the example shown in diagram A. In contrast, diagram B shows how, by overlapping the two data transfer requests, a pipelined system will complete two operations in 5 machine cycles. More particularly, in diagram A, the address/request is sent from the processor to the cache during cycle 1. The array is accessed at cycle 2 and the data is output at cycle 3, the data is then provided to the processor during cycle 4. Cycles 5 through 8 show the same steps for the same, or another processor in a multiprocessor system. It can be seen that 8 machine cycles are required to provide two data words, each of width L, to the processor(s).

FIG. 5 also shows (timing diagram B) how a system having pipelined access and a multiport interleaved cache system improves system performance. The advantages of pipelining are readily apparent when comparing the two diagrams of FIG. 5. In diagram A, it can be seen that the entire data request process must be completed, prior to another processor initiating another data request/address operation. In contrast, diagram B allows concurrent (overlapped) request/address operations, since the data is saved (latched) between each step. More particularly, in diagram B, a first processor requests an address at cycle 1 and accesses the cache array at cycle 2. Simultaneously, during cycle 2, a second processor requests an address to a particular interleaf in the cache. During cycle 3, the data requested by the first processor is placed in the output logic and the second processor accesses the interleaf. The first processor then receives the requested data at cycle 4 and the data for the second processor is placed in the output logic. Finally, at cycle 5, the requested data is provided to the second processor. It can be seen how pipelining drastically improves the system performance by allowing overlapped operations.

FIG. 6 is another set of logical timing diagrams that focus on the effect of using burst-mode logic. In diagram C, a non-pipelined system with burst-mode logic is shown, and it can be seen that the cache system takes 5 cycles to service a data transfer request. However, this request is for data that is twice as wide as that shown in if FIG. 5, i.e. 80 bits (2L) in FIG. 6 as opposed to 40 bits (L) in FIG. 5. Thus, it is apparent, when timing diagrams A and C are compared, that without the burst-mode logic it will take 8 machine cycles to access data that is 2L wide, whereas it will take 5 cycles to access the same amount of data (2L) when burst-mode logic is used (diagram C). Timing diagram D of FIG. 6 shows the effect of combining the pipelined cache system and burst-mode logic. As shown in diagram C, it takes 10 cycles to service two data transfer requests for data 4L in width (160 bits) to be transferred when only burst-mode logic is used without pipelining. However, using a cache system, with pipelining and burst-mode logic, the two 4L data transfer operations are completed in 7 machine cycles (diagram D). The shaded portion of diagram D accounts for the fact that the data bus can only transfer data of L width at a given time.

More particularly, in diagram C the burst-mode feature is used, but without pipelining capability. At cycle 1, a processor sends an address/request to the cache. At cycle 2, the array is accessed, and at cycle 3 the data having a width of 2L is placed in the burst-mode output logic. The data is then provided to the processor during cycles 4 and 5, each data word provided has a width of L in order to provide data equivalent to a data word of width 2L, which is stored in the cache. Cycles 6 through 10 use the same steps to provide data of a width 2L to the same or another processor. Timing diagram D uses the burst-mode output logic in conjunction with pipelining ill order to further reduce the number of cycles needed to access data in the cache. At cycle 1, a processor sends an address/request signal to the cache interleaf. The array is then accessed at cycle 2, and another address/request sent to the cache by the same, or another processor. At cycle 3, the first requested data is placed in the burst-mode output logic and the second requested data is accessed. The first data word of width L (of the first requested data) is then provided to the first requesting processor at cycle 4, while the second requested data is placed in the burst-mode output logic. At cycle 5, the second data word of width L, of the first requested data, is provided to the first requesting processor. At cycle 6, the first data word of width L, of the second requested data is provided to the requesting processor and the second data word of width L is then provided at cycle 7. It can be seen from diagram D that it takes four cycles from the time the address/request is sent by a processor to the cache until data is provided from the cache.

To summarize, in timing diagram A (non-pipelined, no burst-mode) it will take 16 cycles to complete data requests for a total data width of 4L. However, by using pipelining and burst-mode, as shown in diagram D, the same amount of data (4L) can be accessed in 7 machine cycles.

Thus, using the pipelined and burst-mode processing techniques of the present invention, when a four way multiprocessor system is provided, a processor request will be serviced each machine cycle, beginning with cycle 4. It should be noted that FIG. 6 shows a 4L amount of data being provided to the processor(s), while FIG. 5 shows data having a width of 2L,. FIG. 6 effectively shows that twice as much data can be accessed from the cache by a processor, in less time, when pipelining and the burst-mode logic are used.

Although certain embodiments have been shown and described, it will be understood that certain changes and modifications may be made therein without departing from the scope of the appended claims.

We claim:

1. A data processing system, having a plurality of processing units, comprising:

a cache for storing data to be utilized by said processing units;

a system bus for transferring data between said cache and said processing units; and circuit means for transferring, in a single operation, input data to said cache from said processing units and output data from said cache to said processing units, in an amount greater than a capacity of said system bus, said circuit means sequentially storing said input data as data words, combining adjacent ones of said data words and providing said combined data word to said cache;

wherein said single operation simultaneously transfers said data between said cache and said plurality of processing units.

2. The system according to claim 1 further comprising pipeline means for latching data which is being stored into and retrieved from said cache.

3. The system according to claim 1 wherein said cache comprises plural interleaved sections each with input and output ports.

4. The system according to claim 1 wherein said output means comprises:

means for separating said combined data word into plural data words; and means for placing said plural data words on said system bus.

5. The system according to claim 4 wherein said means for combining comprises a multiplexer, and said means for storing comprises a store queue.

6. The system according to claim 5 wherein said means for separating comprises a multiplexer and a latch, and said means for placing comprises a register and a driver.

7. The system according to claims 6, further comprising arbitration means for awarding access to one of a plurality of interleaved sections in said cache to the processing unit having the least recent access to said one of said interleaved sections, when more than one of said processing units are concurrently requesting access to the one said interleaved section.

8. The system according to claim 1, further comprising means for directly transferring data between plural ones of said processing units.

9. The system according to claim 8 wherein said means for directly transferring data comprises means for providing said data directly from said means for inputting to said means for outputting, such that the data bypasses said cache.

10. A method of storing data in data processing system, having a plurality of processing units, said method comprising the steps of:

provide data between said cache and said processing units on a system bus; and transferring, in a single operation, input data to said cache from said processing units and output data from said cache to said processing units, in an amount greater than a capacity of said system bus, by sequentially storing said input data as data words, combining adjacent ones of said data words and providing said combined data word to said cache;

wherein said single operation simultaneously transfers said data between said cache and said plurality of processing units.

11. The method according to claim 10 further comprising a step of latching data which is being stored into and retrieved from said cache.

12. The method according to claim 11 wherein said step of storing comprises a step of simultaneously accessing said cache by said plurality of processing units through plural interleaved sections, each with input and output ports.

13. The method according to claim 10 wherein said step of outputting comprises steps of:

separating said combined data word into plural data words; and placing said plural data words on said system bus.

* * * * *